UNITED STATES PATENT OFFICE.

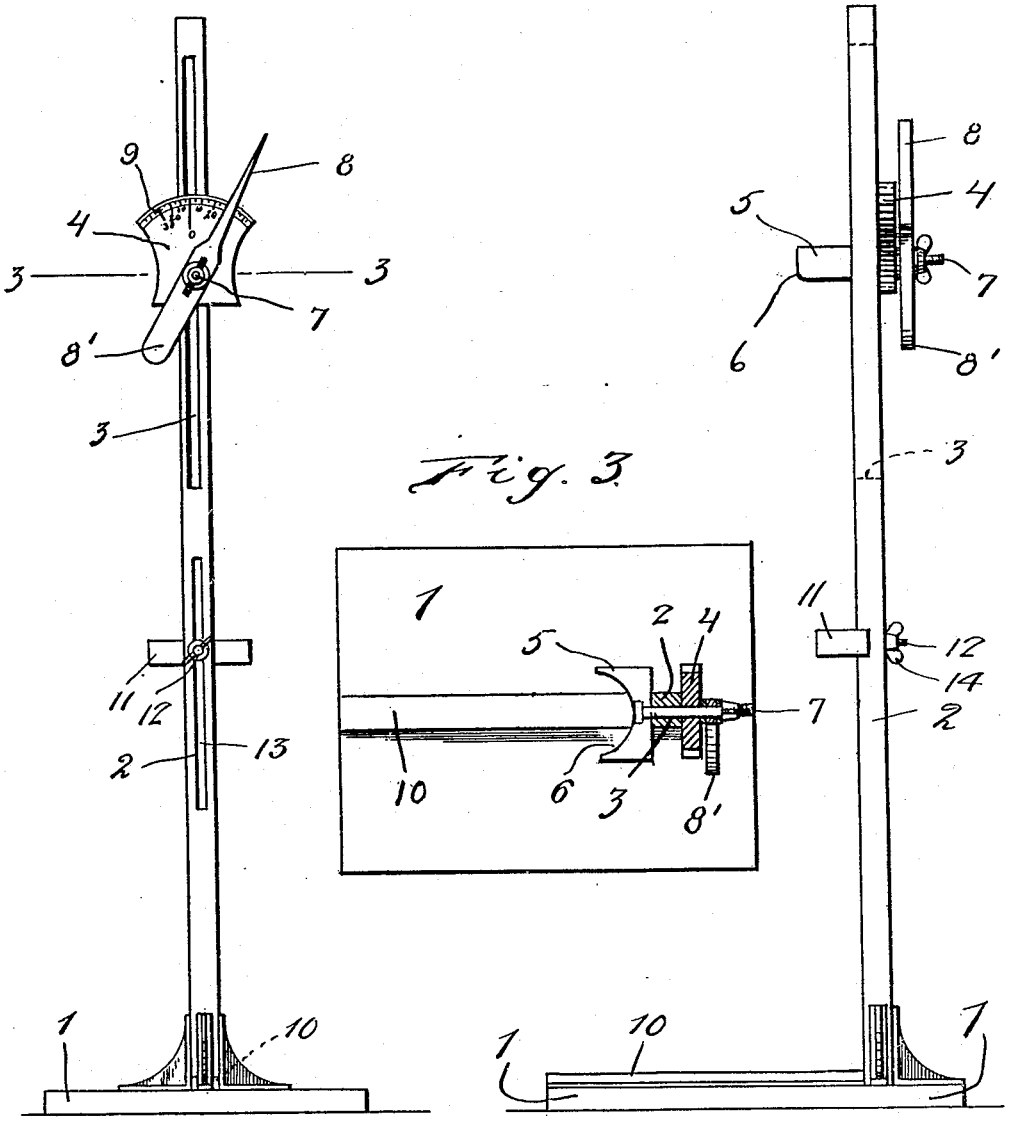

FRANCIS M. WALTERS, OF WARRENSBURG, MISSOURI.

MEASURING INSTRUMENT.

1,302,997.  Specification of Letters Patent.  Patented May 6, 1919.

Application filed May 29, 1918. Serial No. 237,269.

*To all whom it may concern:*

Be it known that I, FRANCIS M. WALTERS, a citizen of the United States, residing at Warrensburg, in the county of Johnson and State of Missouri, have invented new and useful Improvements in Measuring Instruments, of which the following is a specification.

This invention relates to new and useful improvements in measuring instruments and the principal object of the invention is to provide a device for indicating the degree, or angle, a person carries his head from an erect position.

The device is adapted to measure the postural angle of a person; that is, the angle formed by the intersection of a vertical line drawn through the tip of the shoulder and the middle of the instep of a person, in the standing position, with a second line drawn through the tip of his shoulder and the hole of his ear. The device is an aid to teachers of hygiene, and others, in correcting defects of posture of pupils and such other persons as may need and desire such correction.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the invention.

Fig. 2 is a side view.

Fig. 3 is a section on line 3—3 of Fig. 1.

As shown in these views the device consists of a base or platform 1 and a standard 2 suitably secured to said platform. This standard at its upper part is provided with a longitudinal slot 3. 4 indicates a block having its upper edge forming a segment of a circle. 5 indicates another block provided with a recess 6 to receive the shoulder. These two blocks are secured to opposite sides of the standard by means of the bolt 7 passing through said blocks and through the slot 3 in the standard. A pointer or finger 8 is pivotally mounted on the block 4 and is adapted to coöperate with a scale 9 suitably marked on the curved edge of the block with the degrees or divisions of part of a circle. The pointer is provided with a projecting lower end 8' which is adapted to be seized by the fingers to move the pointer to different positions on the scale. The cross piece 10 on the base is to indicate the position the feet of the person being measured are to occupy.

I may locate on the lower portion of the standard a movable block 11, provided with a screw bolt 12, which passes through a slot 13 in the standard. A nut 14 holds the block in adjusted position. This block is provided with a curved recess for receiving the thigh and keeping it in a fixed position while a person is being measured.

The invention is used as follows: To measure the postural angle the person stands upon the base of the instrument with the right side next the measuring device and the heels just touching the cross piece extending across the base. The measuring device is then adjusted to the shoulder tip and the person told to look straight forward keeping the eyes on a level. The observer now turns the pointer until it comes between his eye and the hole in the ear. The observer being located in a definite position at the side. The degrees are now read off designating the postural angle. If the angle is forward it is designated as a minus angle. If backward as a positive angle. To correct the posture with this instrument, the person is placed on the instrument and shown how to stand and how to adjust the head, neck, and spine in order to reduce the postural angle to zero.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

What is claimed is:—

1. A device of the class described, comprising a standard, a sliding member adjustably secured on said standard and having a scale thereon and a pointer pivoted to said member, said pointer being adapted to be moved to a point which will register with the ear of the person and registering with the scale.

2. A device of the class described, comprising a standard, a movable member adjustably connected with the standard, and having a scale thereon, a shoulder-engaging part on said member for holding a person with his side adjacent the standard and a pointer carried by said member for registering with the ear of a person whose shoulder is held by said part and registering with said scale.

3. A device of the class described comprising a base, a standard secured thereto and having a longitudinal slot, a movable member consisting of a scale carrying part and a shoulder-engaging part, a bolt passing through said slot and connecting said parts together and a pointer carried by the scale carrying part and registering with the scale.

In testimony whereof I affix my signature.

FRANCIS M. WALTERS.

Copies of this patent may be obtained for five cents each, by addressing the "Commissioner of Patents, Washington, D. C."